(12) United States Patent
Sung et al.

(10) Patent No.: US 7,765,869 B2
(45) Date of Patent: Aug. 3, 2010

(54) COMBINED ACCELEROMETER AND GYROSCOPE SYSTEM

(75) Inventors: Sang Kyung Sung, Seoul (KR); Young Jae Lee, Seoul (KR); Tae Sam Kang, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 307 days.

(21) Appl. No.: 11/956,582

(22) Filed: Dec. 14, 2007

(65) Prior Publication Data
US 2009/0019933 A1 Jan. 22, 2009

(30) Foreign Application Priority Data
Jul. 19, 2007 (KR) .................. 10-2007-0072411

(51) Int. Cl.
*G01P 9/04* (2006.01)
*G01C 19/56* (2006.01)
(52) U.S. Cl. ............... 73/504.04; 73/504.12; 73/514.29
(58) Field of Classification Search ............. 73/504.02, 73/504.04, 504.12, 504.14, 504.15, 514.32, 73/514.16, 514.29, 510, 511
See application file for complete search history.

(56) References Cited
U.S. PATENT DOCUMENTS

| | | | | |
|---|---|---|---|---|
| 4,566,327 A | * | 1/1986 | Rider ........................ | 73/510 |
| 5,392,650 A | * | 2/1995 | O'Brien et al. .......... | 73/514.18 |
| 5,481,914 A | * | 1/1996 | Ward ....................... | 73/504.16 |
| 6,253,612 B1 | * | 7/2001 | Lemkin et al. ........... | 73/504.02 |
| 6,578,420 B1 | * | 6/2003 | Hsu ......................... | 73/504.16 |
| 6,725,719 B2 | * | 4/2004 | Cardarelli ................ | 73/504.04 |
| 6,848,304 B2 | * | 2/2005 | Geen ....................... | 73/504.04 |

\* cited by examiner

*Primary Examiner*—Helen C. Kwok
(74) *Attorney, Agent, or Firm*—LRK Patent Law Firm

(57) ABSTRACT

An embodiment of the present invention relates to a combined accelerometer and gyroscope system. The combined accelerometer and gyroscope system includes a combined accelerometer and gyroscope for maintaining vibration of a mass body at a constant amplitude using an applied drive voltage, and detecting vibration signals in directions of an acceleration axis and an angular velocity axis. An acceleration axis vibration signal obtainment unit obtains the vibration signal in the direction of the acceleration axis. An amplitude maintenance control unit outputs an acceleration axis vibration maintenance control signal using the vibration signal. An acceleration axis driving input unit receives a voltage signal from the amplitude maintenance control unit and applies the voltage signal to the combined accelerometer and gyroscope. An angular velocity axis vibration signal obtainment unit obtains the vibration signal in the direction of the angular velocity axis. A force balance control unit outputs an angular velocity axis vibration maintenance control signal using the vibration signal received from the angular velocity axis vibration signal obtainment unit. An angular velocity axis driving input unit receives a voltage signal received from the force balance control unit and applies the voltage signal to the combined accelerometer and gyroscope.

7 Claims, 6 Drawing Sheets

COMBINED ACCELEROMETER AND GYROSCOPE SYSTEM

BACKGROUND OF THE INVENTION

1. Field of the Invention

The present invention relates, in general, to an accelerometer and gyroscope system, and, more particularly, to a combined accelerometer and gyroscope system, which can measure an acceleration and an angular velocity that are input in directions perpendicular to each other.

2. Description of the Related Art

Generally, inertial sensors for measuring an inertial force can be classified into an accelerometer and a gyroscope, which have been developed as independent inertial sensors and are marketed as individual devices. Accordingly, recently, methods using both an accelerometer and a gyroscope, as in the case of fields in which an inertial force is measured, or a location and a posture are calculated, have been promoted.

Meanwhile, in an inertial measurement unit for measuring inertial force in three axes, such as in an aircraft, missile or a submarine, three or more accelerometers and three or more gyroscopes are required. In order to manufacture such an inertial measurement unit, an inter-axis alignment procedure must be performed in order to align the three axes with each other in perpendicular directions. However, such inter-axis alignment incurs a high cost and takes a lot of time in the stage of manufacturing an inertial measurement unit, and the perpendicular alignment of a gyroscope entails a more complicated procedure than an accelerometer.

The use of individual accelerometers and gyroscopes in fields, in which accelerations and angular velocities for two or more axes are used together, is disadvantageous in that the size and cost thereof are increased, and, additionally, a lot of time and effort is required to conduct alignment between a number of sensor input axes proportional to the number of sensors.

Therefore, when a plurality of accelerometers and gyroscopes for measuring inertial forces input to a plurality of axes is used, the development of inertial sensors having sensor input angles that are structurally aligned with each other using a single mechanical structure is urgently required.

SUMMARY OF THE INVENTION

Accordingly, the present invention has been made keeping in mind the above problems occurring in the prior art, and an object of the present invention is to provide a combined accelerometer and gyroscope system, which can measure an acceleration and an angular velocity that are input in directions perpendicular to each other.

In order to accomplish the above object, the present invention provides a combined accelerometer and gyroscope system, wherein vibration is applied to a driving axis of a gyroscope using vibration in a direction of an acceleration axis of a mass body; input acceleration is detected using an amplitude control signal, corresponding to the vibration in the direction of the acceleration axis, at a time of inputting an acceleration; and Coriolis force, generated in a direction of an angular velocity axis due to the vibration of the driving axis of the gyroscope, is detected at a time of inputting an angular velocity.

Further, the present invention provides a combined accelerometer and gyroscope system, comprising a combined accelerometer and gyroscope for maintaining vibration of a mass body at a constant amplitude using an applied drive voltage, and detecting vibration signals in directions of an acceleration axis and an angular velocity axis; an acceleration axis vibration signal obtainment unit for obtaining the vibration signal in the direction of the acceleration axis detected by the combined accelerometer and gyroscope; an amplitude maintenance control unit for outputting an acceleration axis vibration maintenance control signal, required to obtain a constant vibration amplitude, using the vibration signal received from the acceleration axis vibration signal obtainment unit; an acceleration axis driving input unit for receiving a voltage signal from the amplitude maintenance control unit and applying the voltage signal to the combined accelerometer and gyroscope; an angular velocity axis vibration signal obtainment unit for obtaining the vibration signal in the direction of the angular velocity axis detected by the combined accelerometer and gyroscope; a force balance control unit for outputting an angular velocity axis vibration maintenance control signal, which is required to have a constant vibration amplitude, using the vibration signal received from the angular velocity axis vibration signal obtainment unit; and an angular velocity axis driving input unit for receiving a voltage signal from the force balance control unit and applying the voltage signal to the combined accelerometer and gyroscope.

DESCRIPTION OF THE PREFERRED EMBODIMENTS

The above and other objects, features and other advantages of the present invention will be more clearly understood from the following detailed description taken in conjunction with the accompanying drawings. Before the description of the present invention, it should be noted that the terms or words used in the present specification and claims are to be interpreted as having the meaning and concept corresponding to the technical spirit of the present invention on the basis of the principle by which the inventor can suitably define the concept of terms to describe the invention thereof in the best way. Further, it should be noted that detailed descriptions may be omitted if it is determined that the detailed descriptions of related well-known functions and constructions would make the gist of the present invention unclear.

Hereinafter, embodiments of the present invention will be described in detail with reference to the attached drawings.

Figure 1:
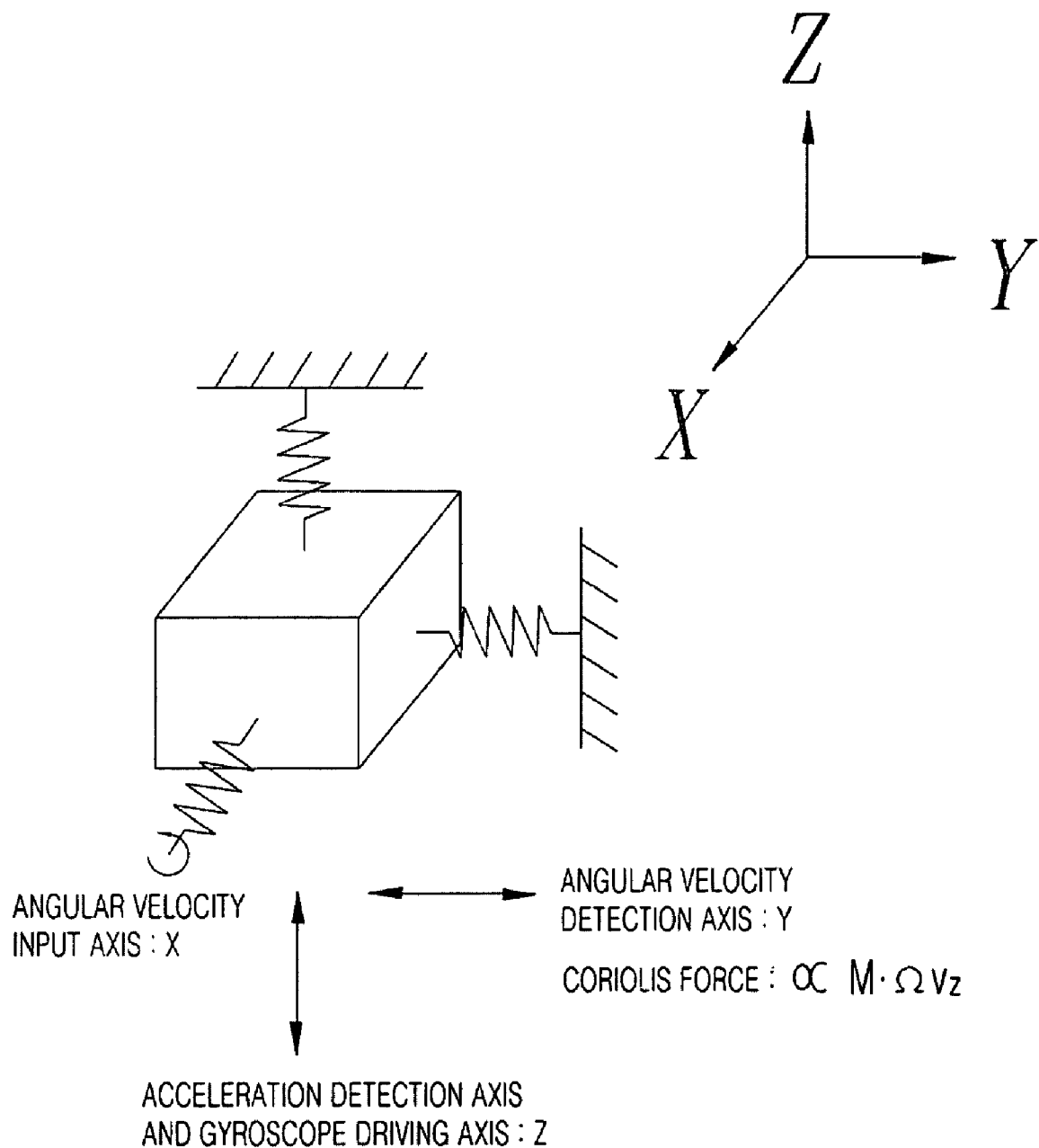
FIG. 1 is a diagram of an example showing the operating principles of a combined accelerometer and gyroscope according to the present invention.

FIG. 1 is a diagram of an example showing the operating principles of a combined accelerometer and gyroscope system according to the present invention.

First, in order to describe the principles of an accelerometer, a dynamic equation, used when vibration occurs in the direction of an acceleration detection axis (Z axis), is taken into consideration. In this case, the force for inducing the vibration of a mass body M in the Z axis direction is the electrostatic force generated due to the potential difference between the mass body and detection axis electrodes. If the distance between the mass body and the detection axis electrodes changes due to the acceleration applied in the Z axis direction, the electrostatic forces induced at both electrodes are changed, and the vibration amplitude of the mass body is changed in response to a certain drive voltage signal. In this case, the present invention adopts the operating principles of maintaining the vibration amplitude of the mass body constant even when the distance between the electrodes changes according to input acceleration, and to detect an applied acceleration signal using a vibration amplitude control voltage to maintain the vibration amplitude constant.

Meanwhile, the operating principles of a gyroscope are taken by basically assuming vibration characteristics showing constant amplitude in the Z axis direction, regardless of the input acceleration signal. That is, vibration showing a constant amplitude in the Z axis direction functions as the factor of the dynamics of the driving axis of a resonance gyroscope. Therefore, the present invention adopts the operating principle of inducing Coriolis force in the direction of an angular velocity detection axis (Y axis) when an angular velocity is input to the angular velocity input axis (X axis).

Figure 2:
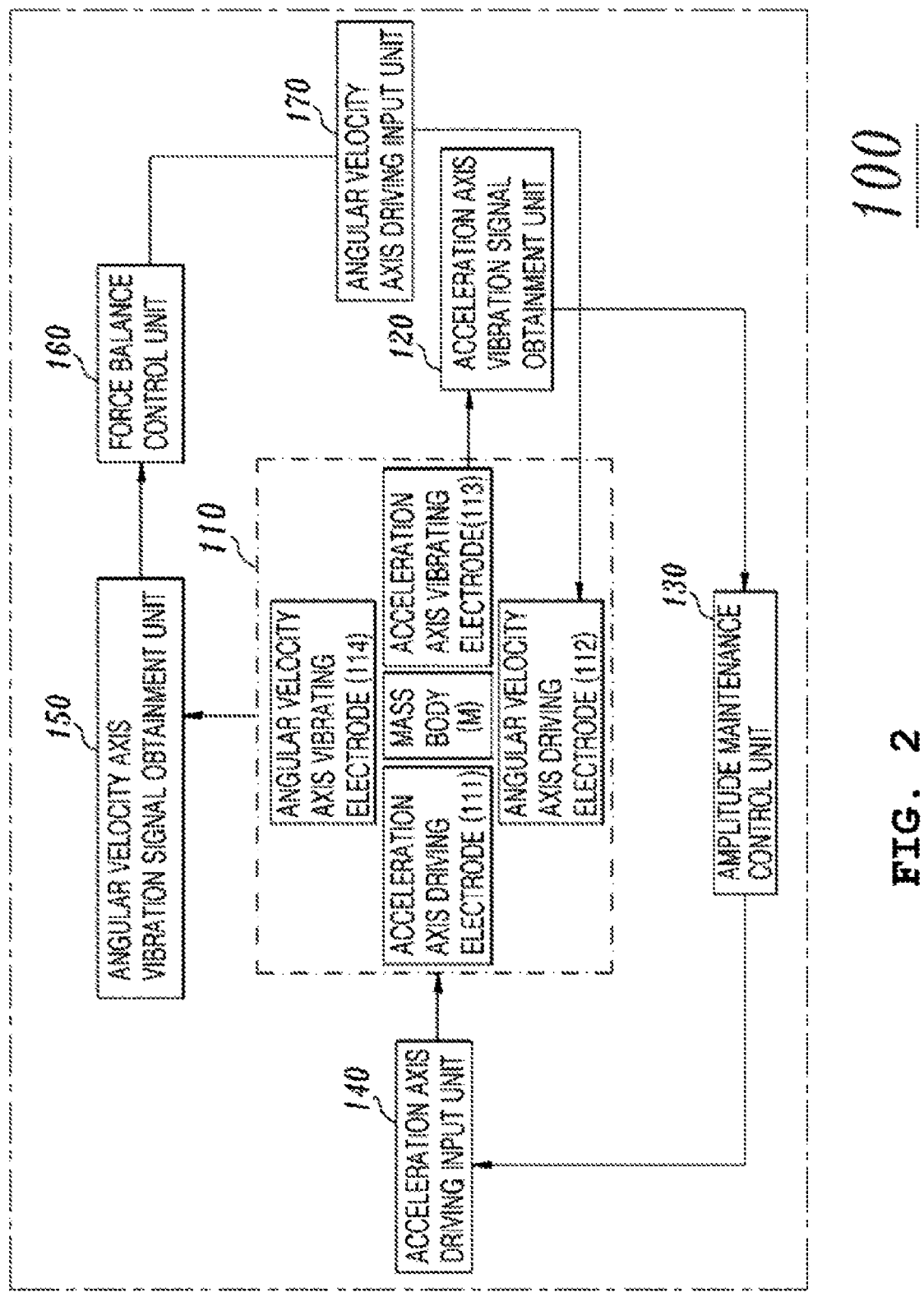
FIG. 2 is a diagram showing the overall construction of a combined accelerometer and gyroscope system according to the present invention.

FIG. 2 is a diagram conceptually showing the construction of a combined accelerometer and gyroscope system (hereinafter referred to as a 'system') according to the present invention. As shown in the drawing, the system includes a combined accelerometer and gyroscope 110, an acceleration axis vibration signal obtainment unit 120, an amplitude maintenance control unit 130, an acceleration axis driving input unit 140, an angular velocity axis vibration signal obtainment unit 150, a force balance control unit 160, and an angular velocity axis driving input unit 170.

The combined accelerometer and gyroscope 110 functions to maintain vibration of a mass body M at a constant amplitude using an applied drive voltage and to detect vibration signals in the directions of an acceleration axis and an angular velocity axis, and includes an acceleration axis driving electrode 111 and an angular velocity axis driving electrode 112 for receiving the acceleration axis driving voltage and the angular velocity axis driving voltage, respectively, and an acceleration axis vibrating electrode 113 and an angular velocity axis vibrating electrode 114 for detecting a vibration signal in the direction of the acceleration axis and a vibration signal in the direction of the angular velocity axis, respectively.

The acceleration axis vibration signal obtainment unit 120 functions to obtain the vibration signal in the direction of the acceleration axis detected by the acceleration axis vibrating electrode 113.

Figure 3:
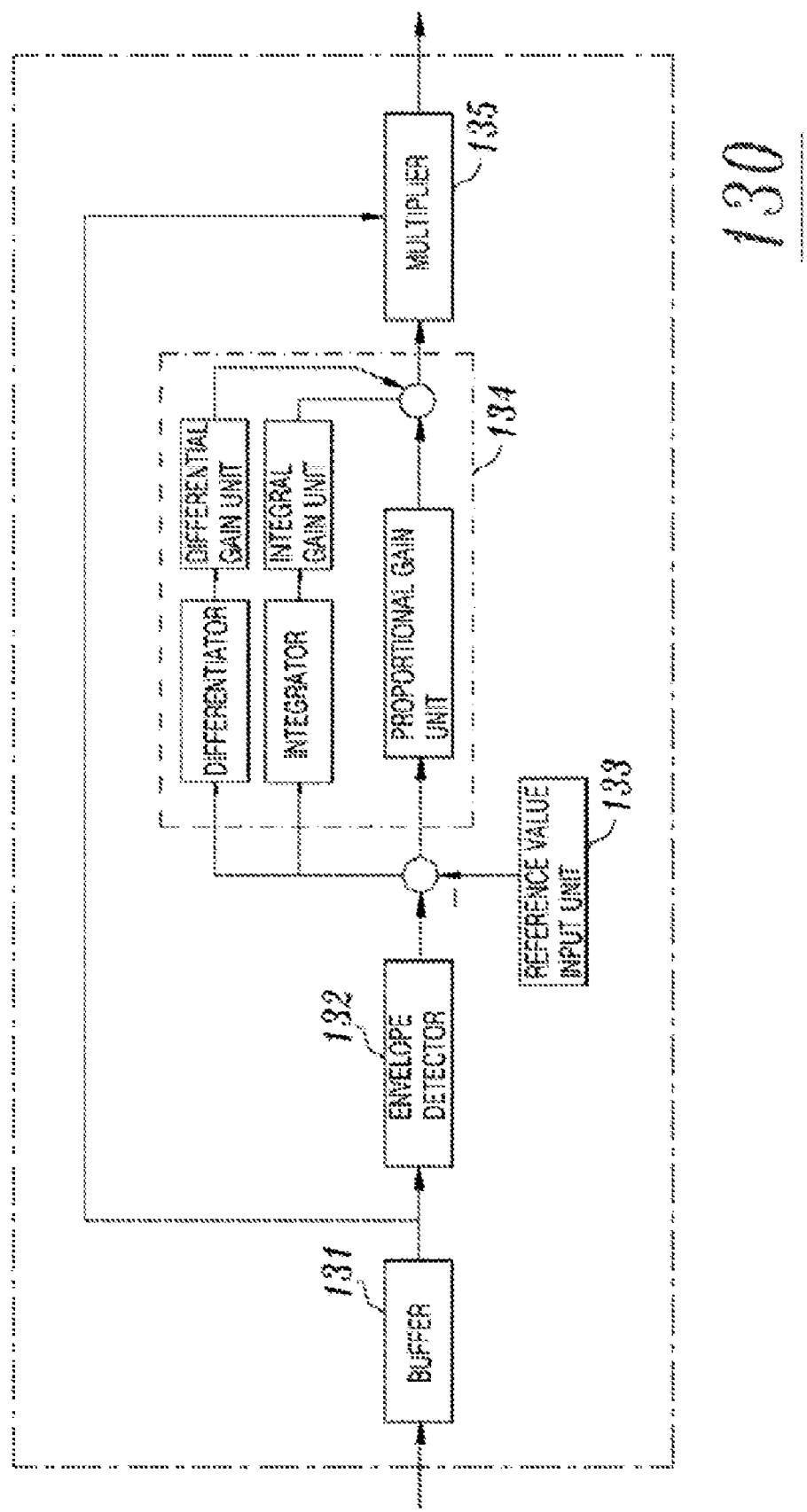
FIG. 3 is a detailed diagram showing an amplitude maintenance control unit according to the present invention.

The amplitude maintenance control unit 130 functions to output an acceleration axis vibration maintenance control signal required to have a constant vibration amplitude using the vibration signal received from the acceleration axis vibration signal obtainment unit 120. As shown in FIG. 3, the amplitude maintenance control unit 130 includes a buffer 131, an envelope detector 132, a reference voltage input unit 133, a controller 134, and a multiplier 135. The buffer 131 outputs the vibration signal, received from the acceleration axis vibration signal obtainment unit 120, both to the envelope detector 132 and to the multiplier 135. The envelope detector 132 detects the envelope of the signal output from the buffer and outputs an envelope signal. The reference voltage input unit 133 generates a reference signal required to induce vibration having a constant magnitude, regardless of the applied acceleration, in order to determine the amplitude of a vibrating body. The controller 134 outputs an acceleration axis vibration maintenance control signal, required to allow an accelerometer to vibrate at a constant amplitude, using both the envelope signal output from the envelope detector 132 and the reference signal output from the reference value input unit 133. The multiplier 135 performs multiplication on the vibration signal output from the buffer 131 and the control signal output from the controller 134, and applies the voltage signal obtained through the multiplication to the acceleration axis driving input unit 140.

The acceleration axis driving input unit 140 functions to receive the voltage signal from the multiplier 135 and to apply the voltage signal to the acceleration axis driving electrode 111.

That is, as the mass body M vibrates using the sine wave drive voltage received through the acceleration axis driving electrode 111, the vibration of mass body M is maintained at a constant amplitude.

Meanwhile, the angular velocity axis vibrating electrode 114 and the angular velocity axis vibration signal obtainment unit 150 are configured to detect Coriolis force generated in the direction of a product of vectors along both axes when an angular velocity is input in a direction perpendicular to the acceleration axis. Further, the angular velocity axis vibration signal, output from the angular velocity axis vibration signal obtainment unit 150, is applied to the force balance control unit 160, so that the vibration characteristics of the angular velocity axis, caused according to the input angular velocity, can be suppressed.

In detail, the angular velocity axis vibration signal obtainment unit 150 functions to obtain the vibration signal in the direction of the angular velocity axis, which is detected by the angular velocity axis vibrating electrode 114.

Figure 4:
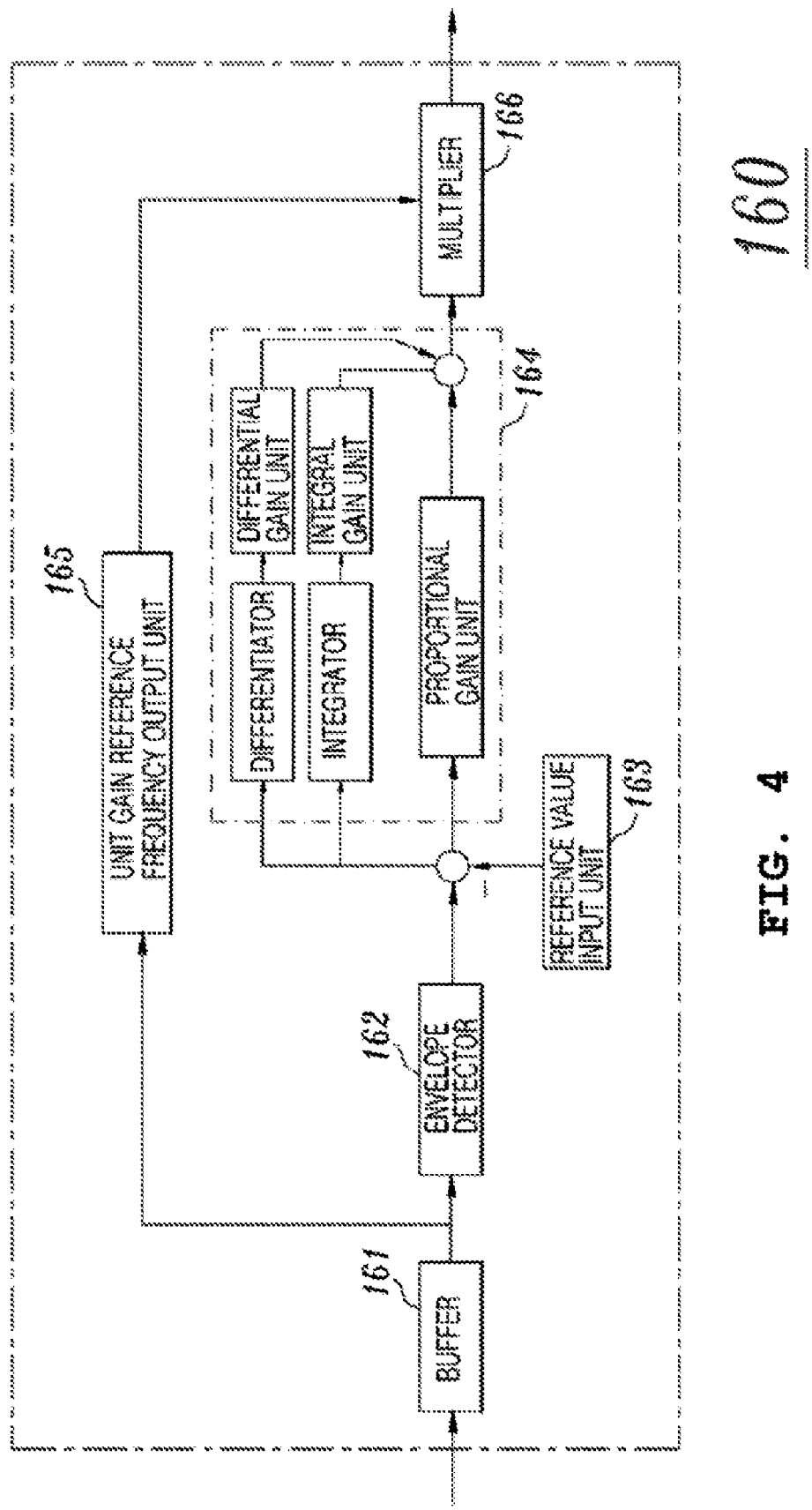
FIG. 4 is a detailed diagram showing a force balance control unit according to the present invention.

The force balance control unit 160 functions to output an angular velocity axis vibration maintenance control signal, which is required to have a constant vibration amplitude, using the vibration signal received from the angular velocity axis vibration signal obtainment unit 150. As shown in FIG. 4, the force balance control unit 160 includes a buffer 161, an envelope detector 162, a reference value input unit 163, a controller 164, a unit gain reference frequency output unit 165, and a multiplier 166. The buffer 161 outputs the vibration signal, received from the angular velocity axis vibration signal obtainment unit 150, both to the envelope detector 162 and to the multiplier 166. The envelope detector 162 detects the envelope of the signal output from the buffer 161, and outputs an envelope signal. The reference value input unit 163 generates a reference signal required to induce vibration having a constant magnitude, regardless of the applied angular velocity, in order to determine the amplitude of a vibrating body. The controller 164 outputs an angular velocity axis vibration maintenance control signal, required to allow a gyroscope to vibrate at a constant amplitude, using both the envelope signal output from the envelope detector 162 and the reference signal output from the reference value input unit 163. The unit gain reference frequency output unit 165 outputs a sine wave signal having a gain of 1 to the vibration signal input from the buffer 161 and having the same frequency and same phase as the vibration signal input from the buffer 161. The multiplier 166 performs multiplication on the sine wave signal, output from the unit gain reference frequency output unit 165, and the control signal, output from the controller 164, and applies the voltage signal obtained through the multiplication to the angular velocity axis driving input unit 170.

The angular velocity axis driving input unit 170 functions to receive the voltage signal input from the multiplier 166 and to apply the voltage signal to the angular velocity axis driving electrode 112.

In this embodiment, the controller 134 of the amplitude maintenance control unit 130 and the controller 164 of the force balance control unit 160 are set to proportional-integral-differential controllers, but the present invention is not limited to this embodiment, and may be variously modified.

Further, in this embodiment, the unit gain reference frequency output unit 165 may include a gain unit implemented with an amplifier, which uses an Operational Amplifier (OP-amp), and configured to amplify an input signal by a high gain factor, a limiter for outputting a square wave signal having the same phase as the input signal, and a band pass filter having a frequency corresponding to the resonant frequency of the gyroscope as a center frequency. However, in the structure of the unit gain reference frequency output unit 165, the limiter can be replaced with a comparator that uses an OP-amp having a suitable slew rate, or a Schmitt trigger circuit based on the intensity of a noise signal, and thus the present invention is not limited to this structure.

Figure 5:
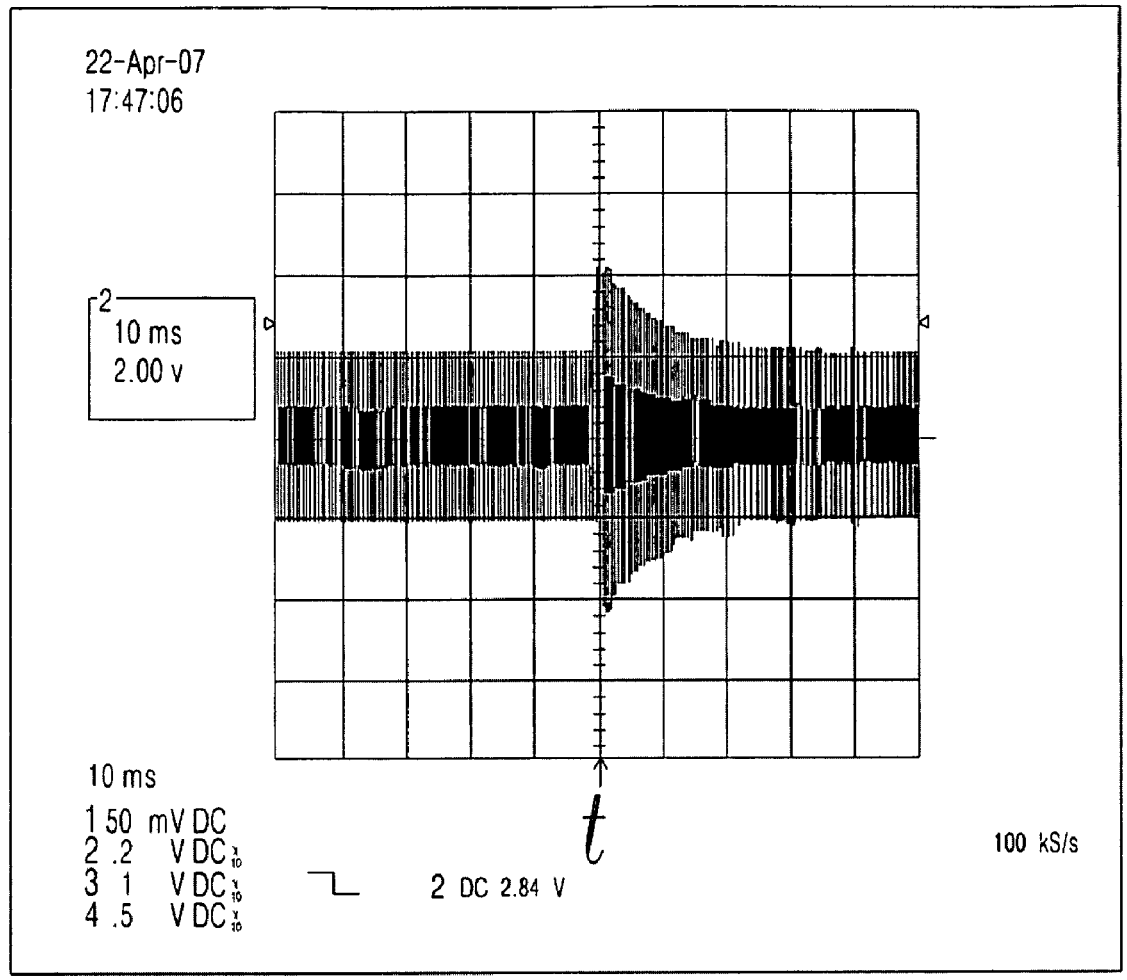
FIG. 5 is a graph showing variation in vibration amplitude obtained when acceleration is applied through a combined accelerometer and gyroscope system according to the present invention.

Meanwhile, FIG. 5 is a graph showing variation in the amplitude obtained when acceleration is applied through the combined accelerometer and gyroscope system 100 according to an embodiment of the present invention. In FIG. 5, when acceleration corresponding to about 5 g is applied at t=0 seconds, the vibration amplitude signal rapidly converges to reach a steady state, and the vibration amplitude in this steady state is equal to that of the vibration amplitude signal before acceleration is applied. Therefore, it can be seen that the applied acceleration signal can be calculated by demodulating the control signal required to maintain a constant vibration amplitude.

Figure 6:
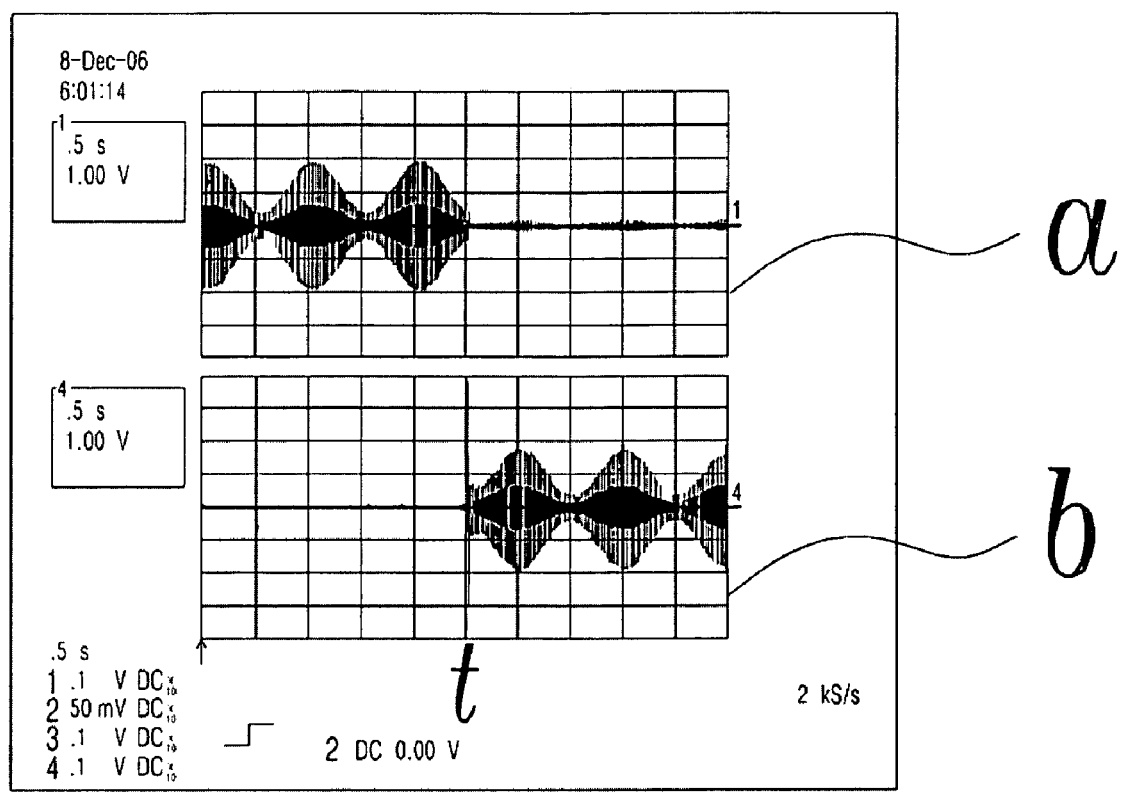
FIG. 6 is a graph showing the results of operation of a controller obtained when an angular velocity is applied through a combined accelerometer and gyroscope system according to the present invention.

FIG. 6 is a graph showing the results of the operation of the controller 164 when an angular velocity is applied through the combined accelerometer and gyroscope system 100 according to an embodiment of the present invention. In FIG. 6, a region of t<0 indicates the results of an open loop test in which the controller 164 is not operated, and a region of t>0 indicates the results of a test in which the controller 164 is operated. Further, a signal 'a' is a displacement signal output in the direction of a gyroscope axis, and b is the output signal of the controller 164.

That is, the detection axis displacement signal of the gyroscope is adjusted to a value close to '0' at the moment that the controller 164 is operated. At this time, a value proportional to the displacement signal is output by the control signal, which is required to suppress the displacement signal, and the angular velocity can be calculated by modulating the control signal.

According to the present invention, there is an advantage in that the control of vibration having a constant amplitude is performed with respect to the acceleration input axis of a mass body structure, so that a vibration-type accelerometer is implemented, and in that a Coriolis force is detected in a direction corresponding to a product of vectors with respect to an angular velocity input perpendicular to a vibration axis, so that a vibration-type gyroscope is implemented, thus providing a system having sensor input angles that are structurally aligned with each other using a single mechanical structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, all suitable modifications, additions, substitutions, and equivalents thereof should be interpreted as being included in the scope of the present invention.

What is claimed is:

1. A combined accelerometer and gyroscope system, comprising:

a combined accelerometer and gyroscope that maintains vibration of a mass body at a constant amplitude using an applied drive voltage, and that detects vibration signals in directions of an acceleration axis and an angular velocity axis;

an acceleration axis vibration signal obtainment unit that obtains the vibration signal in the direction of the acceleration axis detected by the combined accelerometer and gyroscope;

an amplitude maintenance control unit that outputs an acceleration axis vibration maintenance control signal, required to obtain a constant vibration amplitude, using the vibration signal received from the acceleration axis vibration signal obtainment unit;

an acceleration axis driving input unit that receives a voltage signal from the amplitude maintenance control unit and applies the voltage signal to the combined accelerometer and gyroscope;

an angular velocity axis vibration signal obtainment unit that obtains the vibration signal in the direction of the angular velocity axis detected by the combined accelerometer and gyroscope;

a force balance control unit that outputs an angular velocity axis vibration maintenance control signal, which is required to have a constant vibration amplitude, using the vibration signal received from the angular velocity axis vibration signal obtainment unit; and an angular velocity axis driving input unit that receives a voltage signal from the force balance control unit and applies the voltage signal to the combined accelerometer and gyroscope.

2. The system according to claim 1, wherein the combined accelerometer and gyroscope comprises:

an acceleration axis driving electrode and an angular velocity axis driving electrode that receive an acceleration axis drive voltage and an angular velocity axis drive voltage, respectively; and an acceleration axis vibrating electrode and an angular velocity axis vibrating electrode that detect the vibration signal in the direction of the acceleration axis and the vibration signal in the direction of the angular velocity axis, respectively.

3. The system according to claim 1, wherein the amplitude maintenance control unit comprises:

a buffer that outputs the vibration signal, received from the acceleration axis vibration signal obtainment unit, both to an envelope detector and to a multiplier;

an envelope detector that detects an envelope of a signal output from the buffer and outputs an envelope signal;

a reference value input unit that generates a reference signal required to induce vibration having a constant magnitude, regardless of an applied acceleration;

a controller that outputs an acceleration axis vibration maintenance control signal, required to allow an accelerometer to vibrate at a constant amplitude, using both the envelope signal output from the envelope detector and the reference signal output from the reference value input unit; and a multiplier that performs multiplication on the vibration signal, output from the buffer, and the control signal, output from the controller, and applies a voltage signal obtained through the multiplication to the acceleration axis driving input unit.

4. The system according to claim 3, wherein the controller of the amplitude maintenance control unit is a proportional-integral-differential controller.

5. The system according to claim 1, wherein the force balance control unit comprises:
- a buffer that outputs the vibration signal, received from the angular velocity axis vibration signal obtainment unit, both to an envelope detector and to a multiplier;
- the envelope detector that detects an envelope of a signal output from the buffer and outputs an envelope signal;
- a reference value input unit that generates a reference signal, required to induce vibration having a constant magnitude, regardless of an applied angular velocity;
- a controller that outputs an angular velocity axis vibration maintenance control signal, required to allow a gyroscope to vibrate at a constant amplitude, using both the envelope signal output from the envelope detector and the reference signal output from the reference value input unit;
- a unit gain reference frequency output unit that outputs a sine wave signal having a gain of 1 to the vibration signal, received from the buffer, and having a same frequency and same phase as the vibration signal, received from the buffer; and
- a multiplier that performs multiplication on the sine wave signal, output from the unit gain reference frequency output unit, and the control signal, output from the controller, and applies a voltage signal obtained through the multiplication to the angular velocity axis driving input unit.

6. The system according to claim 5, wherein the controller of the force balance control unit is a proportional-integral-differential controller.

7. The system according to claim 5, wherein the unit gain reference frequency output unit comprises:
- a gain unit implemented with an amplifier, which uses an operational amplifier, and configured to amplify an input signal by a high gain factor;
- a limiter that outputs a square wave signal having a same phase as the input signal; and
- a band pass filter having a frequency corresponding to a resonant frequency of the gyroscope as a center frequency.

* * * * *